No. 752,228. PATENTED FEB. 16, 1904.
H. E. IRWIN.
PNEUMATIC TIRE.
APPLICATION FILED SEPT. 16, 1903.
NO MODEL.
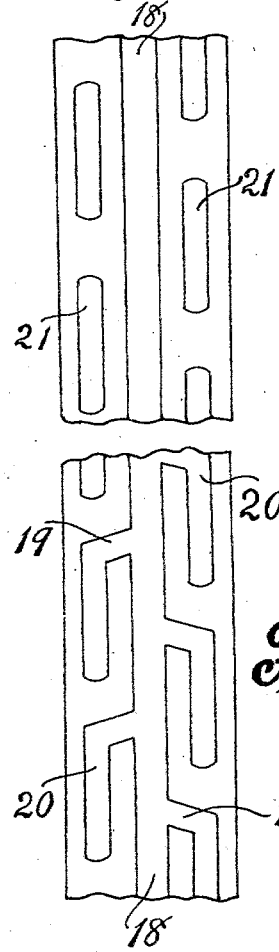
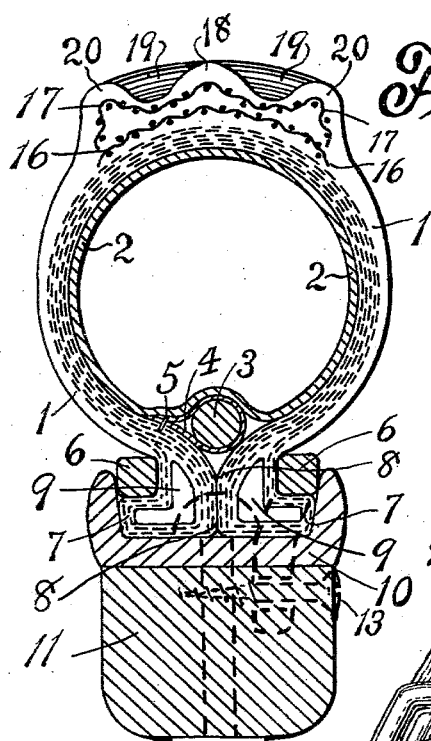
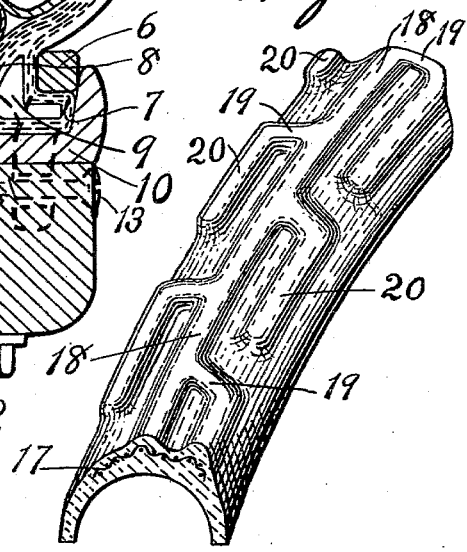
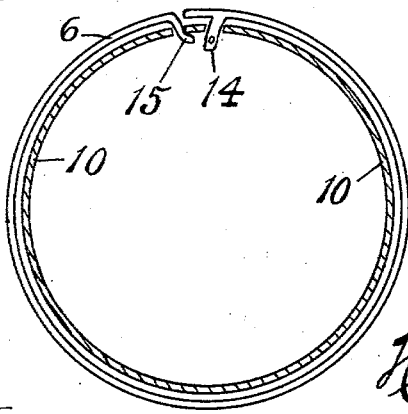
Witnesses:
Geo. F. Swenson
H. J. McMillan
Inventor:
Herbert E. Irwin No. 752,228. Patented February 16, 1904.

UNITED STATES PATENT OFFICE.

HERBERT E. IRWIN, OF GALESBURG, ILLINOIS, ASSIGNOR TO IRWIN RUBBER COMPANY, OF CHICAGO, ILLINOIS, A CORPORATION OF ILLINOIS.

PNEUMATIC TIRE.

SPECIFICATION forming part of Letters Patent No. 752,228, dated February 16, 1904.

Application filed September 16, 1903. Serial No. 173,374. (No model.)

*To all whom it may concern:*

Be it known that I, HERBERT E. IRWIN, a citizen of the United States, residing at Galesburg, in the county of Knox and State of Illinois, have invented certain new and useful Improvements in Pneumatic Tires, of which the following is a specification.

My invention relates to improvements in that class of pneumatic tires that are especially adapted for use upon the wheels of motor-vehicles.

An object of my invention is to construct a tire that may be readily and positively secured to a wheel-rim.

Another object of this invention is to provide a pneumatic tire with an especially-constructed tread, so that the motor-vehicle using them may easily and readily travel through mud and snow.

A further object of the invention is to construct a pneumatic tire with woven-wire fabric embedded within its tread portion to give that part stability and good wearing qualities.

These and such other objects as may hereinafter appear are attained by the devices shown in the accompanying drawings, forming a part of this specification, in which—

Figure 1 is a transverse section of my improved tire. Fig. 2 is a perspective view of a section of the upper half of a tire, showing my improved tire-tread. Fig. 3 is a plan view of one of the securing bands or rings. Figs. 4 and 5 are diagrams of tire-treads.

Similar characters of reference indicate the same parts in the several figures of the drawings.

Referring by numerals to the accompanying drawings, 1 indicates the outer casing or cover of the tire, which incloses an inner air-tube 2. The outer casing is rifted on its inner circumference at 8 8, adjacent to which rift are flanges having their centers preferably composed of rubber rings 9 9, the outer edges 7 7 of the flanges being arranged to lie under broken metallic securing rings or bands 6 6, which lie within the channeled metallic tire 10, that is secured to wood felly 11 by bolt 12. Above the junction of the flanges of the outer casing and beneath the air-tube is placed ring 3, which is secured in a fabric ring-cover that is fastened to the inner side of the tire-casing by means of stitches 5. Ring 6 is provided with a hooked projection 15, which engages an opening in the metallic tire. Tongue 14 on the opposite end of ring 6 is inserted in an opening made in the metallic tire and felly and engaged therein by screw 13. In the tread portion of the casing are embedded woven-wire fabrics 16 and 17, on the surface of which tread portion are formed certain projections consisting, preferably, of a central rib 18, from which extend branches 19 19, that connect it to the outer or side ribs 20 20. Outer or side ribs 21 are not connected to the central rib.

I have constructed my metallic securing-rings as especially applicable in locking the tire to a channeled metallic tire. It is evident that by first placing the hooked end 15 of the securing-ring through the flange of the tire and also through the metallic tire it will remain in engagement therein when the ring is adjusted to the wheel, and when the tongue on the opposite end of the ring is likewise engaged in the wheel-rim and held in place by a screw or similar means the pneumatic tire cannot be removed from its position on the wheel-rim. Ring 6 is shown square in cross-section; but it may be made of round stock. To detach the pneumatic tire from the wheel-rim, first deflate the tire and remove the screw which secures the securing-ring to the wheel-rim. By prying out the tongue 14 the ring is easily removed, and since the channeled metallic tire does not possess overhanging sides the flanges of the tire are easily withdrawn over the shallow channel sides.

Rubber rings 9 9 are cured medium hard and are inserted in the flanges of the tire-casing merely to give them stiffness and form. Notches are removed from the flanges of the tire to accommodate bolt-heads, which prevent the tire from creeping. Fabric ring 3 is preferably inclosed in a fabric cover 4, which may be stitched to the inner fabric layer of the tire-body before the tire is constructed, and when the tire is cured ring 3 is inserted through an opening in the cover and drawn around in place. However, the hinge-ring may be cured or cemented to the inner side of the tire-cover. The hinge-ring acts as a shelf to the air-tube and holds it up and out of the way of the flanges, thus making it easy to attach the tire without danger of pinching the air-tube.

In Fig. 2 I have shown but a single layer of wire fabric in the tread portion of the tire, while in Fig. 1 there are two layers. The wire fabric prolongs the life of the tire and prevents deep rents or cuts in the tire-tread and also gives stiffness to the rib projections on the tread. I do not restrict myself to the exact way in which the wires may be woven. It may be found desirable to crimp the woven-wire fabric before placing it in the tire, as it then would be more flexible. As I desire that the tire have flexible side walls, I have only placed the woven-wire fabric in the tread portion.

Pneumatic tires have been constructed with peripheral ribs or corrugations on their treads, the object of which being to prevent the wheel from slipping or skidding sidewise on a slippery road. The tendency of such a tire is to accumulate soil or foreign matter in the grooves between the ribs or corrugations, and thus form, as it were, lubrication for the tire. In order that my tire may clean itself, I form the outside ribs with openings at frequent intervals. A tire with such a tread can readily climb over a car-rail at an angle or out of a rut. I preferably make use of branches 19 to connect the side ribs with the central rib on rear and power-propelled wheels; but for the front wheels the branch ribs may be dispensed with, as shown in Fig. 4.

I have shown in Fig. 1 my improved tire placed in a channeled metallic tire which is bolted to a wood felly. However, a wire-spoked wheel or a tubular-spoked wheel may have been used with the channeled rim, and there are other changes in the form and proportion of parts and in the details of construction of my improved tire that may be made without departing from the spirit or sacrificing the advantages of the invention, and I would therefore have it understood that I desire to reserve the right to make all such changes as fairly fall within the spirit and scope of my invention.

Having thus fully described my invention, what I claim, and desire to secure by Letters Patent, is—

1. The combination with a channeled wheel-rim, of a tire-casing rifted on its inner periphery and having adjacent to said rift flanges with projections or beads thereon adapted to lie under broken metallic securing-rings, one end of said rings being bent so that when they are engaged with holes in the metallic rim and the rings inserted in the channel of the wheel-rim, the said ends will remain in engagement therein, the other ends of the said rings being provided with inwardly-extending ends or tongues arranged to enter holes in the rim and to be secured therein by means passing through perforations in said ends or tongues, substantially as described.

2. The combination with a channeled wheel-rim consisting of a wood felly having a channeled metallic tire thereon, of a tire-casing adapted to be secured in said channeled tire by means of broken securing-rings, one end of said rings being bent and arranged to engage holes in the metallic tire, the other ends of the rings being provided with inwardly-extending ends or tongues adapted to enter holes in the metallic tire and wood felly, said ends or tongues having perforations therein, and means passing through said perforations and into the wood felly for locking the rings in engagement with the wheel-rim, substantially as described.

3. The combination with a channeled wheel-rim fitted on a wood felly, of a tire-casing rifted on its inner periphery and having adjacent to said rift flanges adapted to be secured in the channeled rim by means of metallic securing-rings, and means passing through the wheel-rim and into notches in said flanges to prevent the tire from creeping, substantially as described.

4. The combination with a channeled wheel-rim, of a tire-casing rifted on its inner periphery and having adjacent to said rift flanges adapted to be secured in the channeled rim by means of metallic securing-rings, means arranged to pass through the wheel-rim and engage the flanges to prevent the tire from creeping, and a hinged ring secured to the inner side of the tire-casing and lying above the junction of said flanges, substantially as described.

5. A pneumatic tire having a series of longitudinally-extending ribs or projections on its tread, said series consisting of an annular central rib and side or outer ribs with openings therein at intervals to allow for the expulsion of foreign matter having accumulated between the ribs, and means for securing said tire to a wheel-rim, substantially as described.

6. A pneumatic tire having a series of longitudinally-extending ribs or projections on its tread, said series consisting of an annular central rib and a rib on each side thereof parallel to the said central rib having openings therein at intervals to allow for the expulsion of foreign matter having accumulated between the ribs, and means for securing said tire to a wheel-rim, substantially as described.

7. A pneumatic tire having a series of longitudinally-extending ribs or projections on its tread, said series consisting of a central rib and side or outer ribs connected thereto by branch ribs, said outer ribs having openings therein at intervals to allow for the expulsion of foreign matter having accumulated between the ribs, and means for securing the tire to a wheel-rim, substantially as described.

8. A pneumatic tire having a series of longitudinally-extending ribs or projections on its tread, said series consisting of an annular central rib and side or outer ribs with openings therein at intervals, woven-wire fabric embedded within the tread portion, and means for securing said tire to a wheel-rim, substantially as described.

9. The combination with a channeled wheel-rim, of a tire-casing rifted on its inner periphery and having adjacent to said rift flanges adapted to be secured in the channeled rim, said casing having a tread portion with woven-wire fabric embedded therein and having thereon a series of ribs or projections, the outer or side ribs of said series being connected to the central rib by means of branch ribs, substantially as described.

In testimony whereof I have signed my name to this specification in the presence of two subscribing witnesses.

HERBERT E. IRWIN.

Witnesses:
W. ROADSTRUM,
A. S. HAMILTON.